United States Patent
Yano et al.

(10) Patent No.: US 9,815,999 B2
(45) Date of Patent: Nov. 14, 2017

(54) INK JET RECORDING METHOD AND INK SET

(71) Applicant: Seiko Epson Corporation, Tokyo (JP)

(72) Inventors: Takeshi Yano, Shiojiri (JP); Ippei Okuda, Shiojiri (JP); Mitsuaki Kosaka, Minowa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/054,719

(22) Filed: Feb. 26, 2016

(65) Prior Publication Data
US 2016/0251532 A1 Sep. 1, 2016

(30) Foreign Application Priority Data

Feb. 27, 2015 (JP) ................... 2015-038291
Apr. 1, 2015 (JP) ................... 2015-075128

(51) Int. Cl.
| | | |
|---|---|---|
| B41J 2/21 | (2006.01) |
| C09D 11/54 | (2014.01) |
| C09D 11/40 | (2014.01) |
| C09D 11/10 | (2014.01) |
| C09D 11/322 | (2014.01) |
| C09D 11/38 | (2014.01) |
| B41M 5/00 | (2006.01) |
| B41M 7/00 | (2006.01) |
| C09D 11/30 | (2014.01) |

(52) U.S. Cl.
CPC .............. *C09D 11/54* (2013.01); *B41J 2/2114* (2013.01); *B41M 5/0011* (2013.01); *B41M 5/0017* (2013.01); *B41M 7/0036* (2013.01); *C09D 11/10* (2013.01); *C09D 11/30* (2013.01); *C09D 11/322* (2013.01); *C09D 11/38* (2013.01); *C09D 11/40* (2013.01)

(58) Field of Classification Search
CPC .................................................... B41J 2/2114
See application file for complete search history.

(56) References Cited

U.S. PATENT DOCUMENTS

| | | | |
|---|---|---|---|
| 9,376,582 B1* | 6/2016 | Dannhauser | C09D 11/54 |
| 2006/0077244 A1* | 4/2006 | Edwards | B41J 11/0015 347/102 |
| 2009/0233061 A1 | 9/2009 | Irita | |
| 2012/0128949 A1 | 5/2012 | Goto | |
| 2013/0176369 A1 | 7/2013 | Gotou et al. | |
| 2013/0202861 A1 | 8/2013 | Ohta | |
| 2013/0293645 A1* | 11/2013 | Yasu | B41J 2/2114 347/101 |
| 2015/0174939 A1* | 6/2015 | Aoyama | C09D 11/322 347/21 |
| 2015/0191031 A1* | 7/2015 | Ohta | B41J 2/2114 428/207 |

FOREIGN PATENT DOCUMENTS

| | | |
|---|---|---|
| JP | 2009-143146 A | 7/2009 |
| JP | 2010-023265 A | 2/2010 |
| JP | 2010-023266 A | 2/2010 |
| JP | 2013-006308 A | 1/2013 |
| JP | 2013-146925 A | 8/2013 |

OTHER PUBLICATIONS

Extended European Search Report for Application No. EP 16 15 7694 dated Jun. 30, 2016 (8 pages).

\* cited by examiner

*Primary Examiner* — Shelby Fidler
(74) *Attorney, Agent, or Firm* — Harness, Dickey & Pierce, P.L.C.

(57) ABSTRACT

The ink jet recording method according to the present invention includes attaching a resin liquid including a resin to a recording medium; attaching a reaction liquid including a reactant for aggregating or thickening a coloring ink component having a coloring material to an area where the resin liquid is attached; attaching the coloring ink to an area where the reaction liquid is attached by an ink jet method; and attaching a clear ink including a resin.

11 Claims, No Drawings

INK JET RECORDING METHOD AND INK SET

BACKGROUND

1. Technical Field

The present invention relates to an ink jet recording method and an ink set.

2. Related Art

An ink jet recording method which causes a recording head of an ink jet recording apparatus to discharge minute ink droplets from nozzles to record an image on a recording medium is known in the related art. In recent years, the ink jet recording method has been used for recording an image not only on a recording medium having excellent ink absorbability (for example, plain paper, or the like), but also recording an image on a recording medium having less ink absorbability (low absorbability) (for example, an art paper, a coated paper, or the like), or a recording medium that hardly absorbs an ink (non-absorbability) (for example, plastic film, or the like). Also, the use of a water-based ink including water as a base has been reviewed as for an ink used for recording an image on the recording medium having low absorbability or non-absorbability, from a viewpoint of global environment and safety.

The water-based ink tends to be repelled on a recording medium having low absorbability or a recording medium having non-absorbability compared to a non-water-based ink including an organic solvent as a base. Accordingly, color unevenness of the recorded image is easily generated on the recording medium having low absorbability or non-absorbability. From this viewpoint, for example, it has been attempted to perform surface modification by corona treatment or plasma treatment before forming an image on a sheet (a recording medium) (JP-A-2013-6308 and JP-A-2013-146925). Also, it has been attempted to react a reaction liquid containing a multivalent metal salt with an aqueous (water-based) ink composition on the recording medium having low absorbability (JP-A-2010-23265 and JP-A-2010-23266).

As described above, it is considered that inconvenience such as ink bleed of an image is suppressed, by bringing an ink into contact with a recording medium using a reaction liquid. However, the reaction liquid may be permeated into the recording medium having low absorbability, and an ink may not encounter a sufficient amount of the reaction liquid, which causes the reaction to be performed insufficiently. Also, since the reaction liquid is aqueous, the recording medium having non-absorbability repels the reaction liquid, which makes it difficult for the liquid to be wet and spread, and the ink may not be in contact with the reaction liquid.

In a case where the reaction liquid is prevented from being repelled or permeated by using a recording medium on which a resin layer is formed by a liquid including a resin, durability of a recorded matter may be degraded.

Furthermore, when an ink is attached to an area, without providing a process of drying the reaction liquid in order to simplify a recording process or an apparatus, the ink component may be fixed on the recording medium in a granular shape. In this case, it is understood that adhesion between the ink component and the recording medium cannot be obtained sufficiently, and durability such as abrasion resistance, in particular, wet abrasion resistance becomes insufficient.

SUMMARY

An advantage of some aspects of the invention is to provide an ink jet recording method and an ink set which can record an image in which printing unevenness is suppressed, and which has excellent abrasion resistance and wet abrasion resistance with respect to a recording medium.

The invention can be realized in the following aspects or application examples.

Application Example 1

According to an aspect of the invention, there is provided an ink jet recording method including: attaching a resin liquid including a resin to a recording medium; attaching a reaction liquid including a reactant for aggregating or thickening a coloring ink component having a coloring material to an area where the resin liquid is attached; attaching the coloring ink to an area where the reaction liquid is attached by an ink jet method; and attaching a clear ink including a resin.

In this case, since the method includes the attaching of the resin liquid, it is possible to attach the reaction liquid to the recording medium with excellent wet spreadability. Also, since the method includes the attaching of the reaction liquid, it is possible to form an image in which printing unevenness is suppressed with respect to the recording medium. Furthermore, since the method includes the attaching of the clear ink, it is possible to form the image having excellent abrasion resistance and wet abrasion resistance.

Application Example 2

In the ink jet recording method according to Application Example 1, the recording medium may be a recording medium having low absorbability or a recording medium having non-absorbability.

In this case, it is easy to fix the reaction liquid on a surface of the recording medium having low absorbability, and causes the reaction liquid to wet and spread on a surface of the recording medium having low absorbability or non-absorbability. Thus, it is possible to form an image having no unevenness and excellent abrasion resistance with respect to the recording medium.

Application Example 3

In the ink jet recording method according to Application Example 1 or 2, the clear ink may be a water-based clear ink including a dispersing element of the resin.

Application Example 4

In the ink jet recording method according to any one of Application Examples 1 to 3, the resin liquid may be a water-based resin liquid including a dispersing element of the resin.

Application Example 5

In the ink jet recording method according to any one of Application Examples 1 to 4, the resin included in the resin liquid and the resin included in the clear ink may be the same as each other.

In this case, it is possible to form an image having more excellent abrasion resistance.

Application Example 6

In the ink jet recording method according to any one of Application Examples 1 to 5, the coloring ink may start to be attached in a state where a residual rate of a volatile component of the reaction liquid attached to the recording medium is 50% by mass or more.

In this case, even the image having granular ink components can have excellent abrasion resistance.

Application Example 7

In the ink jet recording method according to any one of Application Examples 1 to 6, the reactant may include at least one of a metal salt, an organic acid, and a cationic compound.

In this case, it is possible to perform aggregation or thickening of the coloring ink more effectively and form an image having higher quality.

Application Example 8

In the ink jet recording method according to any one of Application Examples 1 to 7, the coloring material may be a pigment, and the coloring ink may be a water-based coloring ink including a resin.

In this case, it is possible to further increase thickening properties of the coloring ink when attached on the recording medium and suppress bleed or effusion of the image.

Application Example 9

In the ink jet recording method according to any one of Application Examples 1 to 8, the resin included in the resin liquid may include at least one of an acrylic resin, an urethane-based resin, and a polyolefin-based resin.

Application Example 10

In the ink jet recording method according to any one of Application Examples 1 to 9, the resin included in the clear ink may include at least one of an acrylic resin, an urethane-based resin, and a polyolefin-based resin.

Application Example 11

In the ink jet recording method according to any one of Application Examples 1 to 10, the attaching of the resin liquid may include the attaching of the resin liquid in which the attachment amount of the resin in the area where the resin liquid is attached may be 0.05 mg/inch$^2$ to 0.5 mg/inch$^2$.

In this case, it is possible to further fix the reaction liquid on the surface of the recording medium to be wet and spread.

Application Example 12

In the ink jet recording method according to any one of Application Examples 1 to 11, the attaching of the reaction liquid may include the attaching of the reaction liquid in which the attachment amount of the reactant included in the reaction liquid in the area where the reaction liquid is attached may be 0.01 mg/inch$^2$ to 0.1 mg/inch$^2$.

In this case, it is possible to aggregate or thicken the coloring ink component sufficiently.

Application Example 13

In the ink jet recording method according to any one of Application Examples 1 to 12, the attaching of the clear ink may include the attaching of the clear ink in which the attachment amount of the clear ink in the area where the clear ink is attached may be 0.5 mg/inch$^2$ to 3 mg/inch$^2$.

In this case, it is possible to form an image having more excellent abrasion resistance.

Application Example 14

In the ink jet recording method according to any one of Application Examples 1 to 13, the content of the resin in the clear ink may be 2% by mass to 20% by mass.

In this case, it is possible to form an image having more excellent abrasion resistance.

Application Example 15

According to another aspect of the invention, there is provided an ink set used for the ink jet recording method according to any one of Application Examples 1 to 14, the ink set including: a resin liquid including a resin; a reaction liquid including a reactant for aggregating or thickening a coloring ink component having a coloring material; a coloring ink; and a clear ink including a resin.

In this case, it is possible to attach the reaction liquid on the recording medium with excellent wet spreadability and form an image in which printing unevenness is suppressed, and which has more excellent abrasion resistance.

DESCRIPTION OF EXEMPLARY EMBODIMENTS

Hereinafter, several embodiments of the invention will be described. The embodiments described below are one example of the invention. The invention is not limited to the following embodiments and includes various embodiments implemented within the range not departing the gist of the invention. Also, the entirety of the configurations described below is not necessarily an essential configuration of the invention.

1. INK JET RECORDING METHOD

The ink jet recording method according to the present embodiment includes a resin liquid attachment step for attaching a resin liquid including a first resin to a recording medium; a reaction liquid attachment step for attaching a reaction liquid including a reactant for aggregating or thickening a coloring ink component having a coloring material to an area where the resin liquid is attached; a coloring ink attachment step for attaching the coloring ink to an area where the reaction liquid is attached by an ink jet method; and attaching a clear ink including a second resin.

Hereinafter, the ink jet recording method according to the embodiment will be sequentially described.

1.1. Resin Liquid Attachment Step

The resin liquid attachment step is a step of attaching a resin liquid including a first resin on a recording medium. The resin liquid may be attached on the entire surface of the recording medium, or may be attached on a part of the recording medium. According to this step, the first resin is imparted to the surface of the recording medium, and it is possible to improve the wettability of the surface of the recording medium or to suppress permeation of a liquid (a reaction liquid) to the recording medium. According to the above, at least one of the results can be obtained: one is that the reaction liquid can be fixed near the surface of the recording medium; and the other is that wet spreadability of the reaction liquid on the recording medium is improved.

Therefore, it is possible not to generate coating unevenness of the reaction liquid, cause the coloring ink to easily contact with the reaction liquid, and aggregate or thicken the coloring ink component.

In this step, it is possible to set a coating amount (attachment amount) of the resin liquid such that, for example, a wet surface tension index of the recording medium is 40 mN/m or more. Also, for example, the attachment amount of the first resin (solid content) included in the resin liquid is not particularly limited, and the amount is 0.01 mg/inch$^2$ or more, preferably 0.05 mg/inch$^2$ to 1.0 mg/inch$^2$, and more preferably 0.05 mg/inch$^2$ to 0.5 mg/inch$^2$. The ink jet recording method of the embodiment includes this resin liquid attachment step. The attachment amount corresponds to this attachment step, and all of the attached substances do not always remain in the finally obtained recorded matter. In addition, the attachment amount corresponds to the area where a reaction liquid attachment step and coloring ink attachment step, described below, are performed.

As the means of performing the resin liquid attachment step, various methods such as spin coating, dip coating, spray coating, gravure roll coating, reverse roll coating, bar coating, and an ink jet method can be used, and the method can be appropriately used in consideration of the attachment amount of the resin liquid, the size of the recording medium, and the apparatus configuration.

After the resin liquid attachment step is performed, a step of drying the resin liquid may be included before the reaction liquid attachment step. In this case, for example, the liquid may be dried to the extent that stickiness cannot be felt when contact is made with the resin liquid attached on the recording medium. The resin liquid drying step may be performed by natural drying, but may be performed by heating drying, from a viewpoint of improving drying speed or promoting fusion of the first resin included in the resin liquid to the recording medium. When the resin liquid drying step is performed by heating, the heating method is not particularly limited, and examples of thereof include a heat press method, a normal pressure steam method, a high pressure steam method, and a thermal fixing method. In addition, as a source of heating, an infrared ray (lamp) can be exemplified. When the step of drying a resin liquid is included, it is preferable in the following points: it is easy to make the surface of the resin layer as a flat film; handling of the recording medium when moving the medium can be easy; and the recording medium after the resin liquid attachment step can be stocked easily.

In addition, the ink jet recording method according to the embodiment may include, in addition to the resin liquid attachment step, for example, corona treatment, atmospheric pressure plasma treatment, frame treatment, ultraviolet ray irradiation treatment, and solvent treatment. These treatments can be executed by using known apparatuses. When these treatments are conducted, it is preferable to conduct the treatment before the resin liquid attachment step. By conducting, for example, the corona treatment before the resin liquid attachment step, it is possible to further increase adhesion or wettability of the resin liquid with respect to the surface of the recording medium, and further improve adhesion or abrasion resistance of the image to be recorded.

By performing the resin liquid attachment step, the resin is attached to the surface of the recording medium, but this step may be regarded as a step of modifying the surface of the recording medium. After the resin liquid attachment step, it is preferable to perform the reaction liquid attachment step within 10 days, more preferably within 5 days, and still more preferably within 1 day. By doing this, it is possible to sufficiently utilize the modification effect of the surface by the resin liquid attachment step.

A composition of the resin liquid and the first resin included in the resin liquid will be described below.

1.2. Recording Medium

A recording medium having non-absorbability or low absorbability in the specification indicates a recording medium having properties of not absorbing an ink at all, or hardly absorbing an ink. Quantitatively, the recording medium having non-absorbability or low absorbability indicates a "recording medium of which the water absorption amount is 10 mL/m$^2$ or less within a half of 30 msec from the start of contacting a liquid according to Bristow method". The Bristow method is widely used as a method for measuring the liquid absorption amount in a short period of time, and has been adopted by Japan Technical Association of the Pulp and Paper Industry (Japan TAPPI). The details of the testing method is described in the standard No. 51 "Paper and Paperboard-liquid absorbability testing method-Bristow method" of the "JAPAN TAPPI paper and pulp testing method 2000 version".

Examples of the recording medium having non-absorbability include a medium in which a base material having no ink receiving layer, such as plastic film, a plastic sheet, a plastic plate, and paper, is coated with a plastic, and a medium on which a plastic film is attached. Examples of the plastic herein include polyvinyl chloride, polyethylene terephthalate, polycarbonate, polystyrene, polyurethane, polyethylene, polypropylene, poly(meth)acrylate, and modified products, copolymers, and blended products thereof.

In addition, examples of the recording medium having low absorbability include a recording medium provided with a coating layer for receiving an ink on the surface thereof. As the paper base material, for example, actual printing papers such as an art paper, coated paper, and mette paper can be exemplified. When the base material is a plastic film, the examples thereof include a film of which the surface such as polyvinyl chloride, polyethylene terephthalate, polycarbonate, polystyrene, polyurethane, polyethylene, and polypropylene is coated with a hydrophilic polymer, and a film coated with particles such as silica and titanium, and a binder.

The recording medium having non-absorbability repels a reaction liquid or an ink more than the recording medium having low absorbability does. Therefore, when the recording medium having non-absorbability is used, the effect obtained by the ink jet recording method according to the embodiment (improved effect such as wet spreadability and printing unevenness of the ink) is exhibited more remarkably.

1.3. Reaction Liquid Attachment Step

The reaction liquid attachment step is a step of attaching the reaction liquid including a reactant to an area where the resin liquid is attached after the resin liquid attachment step. The reaction liquid does not need to be attached to the entire area where the resin liquid is attached, and an area where only the resin liquid is attached may remain on the recording medium. The reactant is reacted (interacted) with a coloring material included in a coloring ink (described below) or a resin dispersant (a third resin) which may include in the coloring ink to have a function of aggregating the coloring material, or an action of thickening the coloring ink component. Specifically, the reactant aggregates or thickens the coloring ink component, the aggregation of the color material increases the color developing properties, printing unevenness is reduced, and bleed or effusion in the image can be suppressed by thickening. According to the above, it is possible to suppress the printing unevenness of the image to be recorded.

On the other hand, when the reaction liquid attachment step and coloring ink attachment step are performed on the recording medium on which the resin liquid attachment step is performed, abrasion resistance or wet abrasion resistance of a recorded matter have a tendency to deteriorate. It is assumed that this is because the reactant is easily fixed on the resin layer formed of the resin liquid, and the reactant negatively affects adhesion between the resin layer and the coloring ink layer formed of the coloring ink.

As the method for attaching the reaction liquid, any methods of spin coating, spray coating, gravure roll coating, reverse roll coating, bar coating, and an ink jet method can be used.

The reaction liquid attachment step preferably includes the reaction liquid attachment step in which the attachment amount of the reactant included in the reaction liquid to the recording medium (the attachment amount to the area where the resin liquid is attached) is 0.005 mg/inch$^2$ to 1 mg/inch$^2$, more preferably 0.008 mg/inch$^2$ to 1 mg/inch$^2$, and still more preferably 0.01 mg/inch$^2$ to 1 mg/inch$^2$. When the attachment amount is 0.005 mg/inch$^2$ or more, the coloring material can be easily aggregated, and in some cases, the coloring ink can be easily thickened due to the third resin. The expression that the respective attachment steps include the attachment step having a predetermined attachment amount means that the steps include the attachment step having at least the attachment amount. Therefore, in terms of the reaction liquid attachment step, the ink jet recording method according to the embodiment includes this reaction liquid attachment step. The attachment amount corresponds to this attachment step, and all of the attached substances do not always remain in the finally obtained recorded matter.

The attachment amount corresponds to the area of the recording medium on which the resin liquid attachment step and coloring ink attachment step described below are performed. Since the resin liquid is attached, if the attachment amount of the reaction liquid attachment step is used in the aforementioned attachment amount, it is possible to sufficiently obtain the aggregation effect of the coloring material and the thickening effect by the third resin. In addition, in a case where there is a plurality of attachment areas having the different attachment amounts of the reactant in the reaction liquid attachment step, the attachment amount corresponds to the area having the largest attachment amount of the reactant.

In the ink jet recording method according to the embodiment, it is not necessary to dry the reaction liquid by heating, a step of drying the reaction liquid may be included after the reaction liquid attachment step and before the coloring ink attachment step. In this case, the liquid may be dried to the extent that stickiness cannot be felt when contact is made with the resin liquid attached on the recording medium. The resin liquid drying step may be performed by natural drying, but may be performed by heating drying. The method for heating the reaction liquid is not particularly limited, and the same methods exemplified in the description of heating the resin liquid can be used. In addition, when the step of drying the reaction liquid is included, since it is difficult for the coloring ink to be fixed in a granular shape, for example, the attachment amount of a clear ink in the clear ink attachment step may be reduced. However, the size of the apparatus to be used becomes large or the energy to be used becomes large in the heating and drying step.

In addition, as described above, it is preferable not to include a heating step of heating and drying the reaction liquid after the reaction liquid attachment step, from a viewpoint of simplifying a recording process or a recording apparatus, reducing the time for recording, and preventing damage caused by the heating step for drying the reaction liquid. An example of the damage caused by the heating step is degradation of discharge stability, which is caused by imparting heat to a nozzle surface when the reaction liquid attachment step is performed by the ink jet method. The surface temperature of the recording medium from the reaction liquid attachment step to the coloring ink attachment step is preferably 35° C. or lower, more preferably 30° C. or lower, and still more preferably 25° C. or lower. In addition, the time from the completion of the reaction liquid attachment to the start of the coloring ink attachment is preferably within 30 seconds, more preferably seconds, still more preferably 10 seconds, and particularly preferably 5 seconds. In this case, a residual rate of a volatile component of the reaction liquid described below tends to be within a preferable range.

A composition of the reaction liquid and a reactant included in the reaction liquid will be described below.

1.4. Coloring Ink Attachment Step

The coloring ink attachment step is a step of recording an image on the area where the reaction liquid is attached, using the coloring ink for ink jet recording including the coloring material after the aforementioned reaction liquid attachment step. The coloring ink does not need to be attached on the entire area where the reaction liquid is attached, and the area where the resin liquid and the reaction liquid are attached may remain in the recording medium. According to this, since the coloring material included in the coloring ink is reacted with the reactant to aggregate the coloring material on the surface of the recording medium, the color developing properties of the recorded image can be improved. Furthermore, since the coloring ink is attached on the surface of the recording medium having the reaction liquid uniformly coated (attached) thereon, the reaction (interaction) of the coloring ink and the reactant can be performed. According to this, generation of printing unevenness of the image to be recorded can be suppressed. Furthermore, when the third resin is included in the coloring ink, due to the contact of the third resin with the reactant, the coloring ink can be thickened, diffusion of the components between ink droplets on the recording medium can be suppressed, and bleed or effusion can be reduced.

The "printing unevenness" described in the specification means a phenomenon in which color unevenness is observed on the recorded image, because a color difference is generated between droplets when the droplets of the same coloring ink are attached on the recording medium, or filling of the image fails due to the droplets repelled by the recording medium.

In the coloring ink attachment step, an ink jet recording head is caused to discharge the coloring ink from nozzles, and attach the ink on the surface of the recording medium (the area where the resin liquid and reaction liquid are attached), to record an image on the recording medium. The number of colors in the coloring ink attached in this step is not limited, and may be a single color (single color printing), or multiple colors (color printing). Even when the coloring ink having multiple colors is used, each of the coloring inks are operated as described in the aspect.

The coloring ink attachment step preferably includes the coloring ink attachment step in which the attachment amount of the coloring ink is 0.01 mg/inch$^2$ to 25 mg/inch$^2$, more preferably 0.1 mg/inch$^2$ to 20 mg/inch$^2$, and still more preferably 1 mg/inch$^2$ to 15 mg/inch$^2$, from a viewpoint of a desired color can be imparted to the recorded matter while maintaining the quality of the recorded matter excellent, or the use amount of the coloring ink can be reduced. The upper limit is particularly preferably 10 mg/inch$^2$ or lower. The attachment amount corresponds to the area of the recording medium where the resin liquid attachment step and reaction liquid attachment step are performed. The ink jet recording method according to the embodiment includes this coloring ink attachment step. The attachment amount corresponds to this attachment step, and all of the attached substances do not always remain in the finally obtained recorded matter.

After the coloring ink attachment step, a step of drying the image recorded on the recording medium may be included. In this case, the ink may be dried to the extent that stickiness cannot be felt when contact is made with the resin liquid attached on the recording medium. The image drying step may be performed by natural drying, but may be performed by heating drying, from a viewpoint of the same reasons as described in the case of drying the resin liquid. The image heating method is not particularly limited, and the same methods exemplified in the description of heating method of the resin liquid can be used.

The coloring ink attachment step is more preferably performed in a state where the residual rate of the volatile component of the resin liquid is 50% by mass or more, preferably 60% by mass or more, more preferably 70% by mass or more. When the residual rate of the volatile component of the reaction liquid is 50% by mass or more, it is possible to simplify the drying step, reduce the time for recording, and simplify the recording apparatus or recording process. In contrary, when the coloring ink attachment step is performed in a state where the residual rate of the volatile component of the reaction liquid is high, there is a tendency that the ink component is easily aggregated as large particles, and abrasion resistance and wet abrasion resistance of the recorded matter are degraded.

In the ink jet recording method according to the embodiment, in the recording medium having non-absorbability, the attached reaction liquid is easily fixed on the surface of the recording medium, even in the recording medium having low absorbability, the reaction liquid is easily fixed on the surface of the recording medium due to the first resin included in the resin liquid. Therefore, if the drying is not performed after the reaction liquid attachment step, it is easy to make the residual rate of the volatile component of the reaction liquid to 50% by mass or more. Also, even if the natural drying or the aforementioned heating drying is performed after the reaction liquid, depending on the drying rate, it is possible to make the residual rate of the volatile component of the reaction liquid to 50% by mass or more.

Here, the residual rate of the volatile component of the reaction liquid herein indicates a residual rate (drying rate) of the volatile component of the reaction liquid on the recording medium immediately before starting the attaching of the coloring ink, and can be calculated by the following equation.

$$\text{Volatile component residual rate}[\%] = 100 - ((Af - A)/(Af - Ae)) \times 100$$

In the equation, Af represents a total impartment amount (discharge amount [mg]) of the reaction liquid attached to the recording medium. Also, Ae represents a residual substance amount [mg] of the reaction liquid on the recording medium, in a state where the reaction liquid is dried (volatilized) to the extent that the recorded matter is sufficiently dried to be used. Furthermore, A represents a total mass [mg] of the reaction liquid on the recording medium immediately before the attaching of the coloring ink.

In the equation, Af, as an impartment amount of a reaction liquid, can be obtained from, for example, discharge data of the ink jet recording apparatus and mass per dot. A can be obtained by measuring the mass of the recording medium at the time of starting the attaching of the coloring ink and the mass of the recording medium before the reaction liquid attachment step, and taking the difference between them.

When measuring the residual rate of the volatile component, it is convenient to use a recording medium prepared for the measurement. For example, the measurement can be performed by an electronic balance. Also, when performing the measurement, a relationship between the residual amount and drying time from when the reaction liquid is imparted to when the predetermined heating drying is performed in the platen. Also, when recording is performed by an ink jet recording apparatus, the period of time from when the reaction liquid is imparted to when the coloring ink is imparted may be set to the time obtained from the relationship between the drying time obtained in the above and the residual amount, thereby obtaining a desired residual amount.

The coloring ink attachment step is performed by the ink jet method. The ink jet recording apparatus used in this step is not particularly limited, and for example, any apparatuses are preferable if the apparatus can control discharge timing of the coloring ink from nozzles and a relative position of the nozzles and a medium corresponding to a predetermined image so as to attach an ink on a predetermined position of the medium. A discharge method of the ink from the nozzles is not limited, and for example, electrostatic suction method, piezoelectric method, and thermal jet method are preferable. Also, as a method for changing the relative position of the nozzles and medium, the method may be so-called a serial type or a line type. Also, as a typical ink jet recording apparatus, the apparatus that includes an ink jet recording head, a main body, a tray, a head driving mechanism, and a carriage can be exemplified. The ink jet recording head has a plurality of nozzles, and the nozzles are communicated with an ink cartridge (an ink container) having the nozzles attached thereto or separated therefrom and discharge an ink of the cartridge. Then, for example, at least one ink cartridge may be used with the coloring inks each having different colors filled therein. Also, the ink jet recording apparatus may be configured to discharge various inks (for example, in a case where the resin liquid, reaction liquid, and clear ink are attached by the ink jet method, each of them are introduced to the recording apparatus as an ink), in addition to the coloring ink. If this ink jet recording apparatus is used, it is possible to easily discharge the coloring ink and attach (impart) to the recording medium, and form a predetermined image or a pattern on the recording medium.

1.5. Clear Ink Attachment Step

The clear ink attachment step is a step of attaching a clear ink including a second resin to the area where the reaction liquid is attached, after the aforementioned coloring ink attachment step, at the same time of the coloring ink attachment step, or before the coloring ink attachment step. The clear ink does not need to be attached only on the area where the coloring ink is attached, and may be attached on the entire surface of the recording medium or the area where the coloring ink is not attached. When the clear ink attachment step is performed at the same time of the coloring ink attachment step, for example, in a case where recording is performed on the recording medium facing the head by discharging the ink from the nozzles while changing a relative position of the head having the nozzles and the recording medium, and scanning (passing) for attaching the discharged ink on the recording medium for a plurality of times, scanning for attaching the clear ink to the recording medium by discharging the clear ink is performed, during the same scanning that is carried out for attaching the coloring ink to the recording medium by discharging the coloring ink. When the clear ink attachment step is performed after the coloring ink attachment step, for example, there are two cases: in a case where recording is performed on the recording area by a plurality of times of scanning, after the coloring ink is discharged and attached to the recording area, the clear ink is discharged and attached on the recording area; or in a case where recording is performed on the recording area by one scanning, the nozzle discharging the clear ink is disposed on the downstream side in the scanning direction than the nozzle discharging the coloring ink. When the clear ink attachment step is performed before the coloring ink attachment step, for example, there are two cases: in a case where recording is performed on the recording area by a plurality of times of scanning, after the clear ink is discharged and attached on the recording area, the coloring ink is discharged and attached on the recording area; or in a case where recording is performed on the recording area by one scanning, the nozzle discharging the coloring ink is disposed on the downstream side in the scanning direction than the nozzle discharging the clear ink. Among the above, it is preferable to perform the clear ink attachment step after the coloring ink attachment step, or at the same time of the coloring ink attachment step, from a viewpoint of further exhibiting the effect of the embodiment, and more preferable to perform the clear ink attachment step after the coloring ink attachment step.

According to this step, at least the second resin is imparted to the area where the coloring ink is attached. According to the above, the coloring ink is coated with the clear ink, the coloring ink hardly falls off from the recording medium, and abrasion resistance of the image can be increased. Also, since the coloring ink is barely in contact with moisture from the outside due to the presence of the second resin, wet abrasion resistance can be imparted to the image.

As described above, in the ink jet recording method according to the embodiment, when the coloring ink is attached, the coloring ink component is aggregated. The aggregation improves the color developing properties of the image; however, the aggregate tends to be granular, and the contact area with the recording medium or the first resin may be small. In the ink jet recording method according to the embodiment, the aggregate is made to be in contact with the recording medium by coating the aggregate with the clear ink so as to impart excellent abrasion resistance.

This step, although the attachment amount of the clear ink is not particularly limited, may include, for example, the clear ink attachment step in which the attachment amount is 0.05 mg/inch$^2$ or more, preferably 0.1 mg/inch$^2$ to 5.0 mg/inch$^2$, and more preferably 0.5 mg/inch$^2$ to mg/inch$^2$. In addition, the aforementioned attachment amount corresponds to the area where the reaction liquid attachment step and coloring ink attachment step are performed. The ink jet recording method according to the embodiment includes this clear ink attachment step, the attachment amount of the clear ink in the obtained recorded matter does not always need to be within the aforementioned range.

As the means of performing the clear ink attachment step, for example, various methods such as spin coating, dip coating, spray coating, gravure roll coating, reverse roll coating, bar coating, and an ink jet method can be used, and the method can be appropriately used in consideration of the attachment amount of the clear ink, the size of the recording medium, and the apparatus configuration.

After the clear ink attachment step is performed, a step of drying the clear ink or the entirety of the liquids attached on the recording medium may be included. In this case, for example, the drying may be performed to the extent that stickiness cannot be felt on the recording medium.

The drying may be performed by natural drying, but may be performed by heating drying, from a viewpoint of improving drying speed, promoting fusion of the second resin to the recording medium, or promoting formation of a film. The heating method is not particularly limited, and for example, a heat press method, a normal pressure steam method, a high pressure steam method, and a thermal fixing method can be exemplified.

A composition of the clear ink and the second resin included in the clear ink will be described.

1.6. Operational Effect

According to the ink jet recording method according to the embodiment, since the resin liquid is attached to the recording medium by the resin liquid attachment step, it is possible to improve wettability of the surface of the recording medium or suppress absorbability of the recording medium. According to this, it is possible to attach the reaction liquid to the recording medium with excellent wet spreadability and cause a sufficient reaction. Also, it is possible to fix the reaction liquid on the surface of the recording medium. In addition, since the reaction liquid attached in the reaction liquid attachment step enables the coloring ink component to aggregate or thicken the coloring, it is possible to form an image which has excellent color developing properties and in which printing unevenness is suppressed, on the recording medium. Moreover, since the second resin is attached in the clear ink attachment step, the image can have excellent abrasion resistance and wet abrasion resistance.

2. RESIN LIQUID, REACTION LIQUID, COLORING INK, AND CLEAR INK 2.1. Resin Liquid

In ink jet recording method according to the embodiment, in the resin liquid attachment step, the resin liquid is used. Hereinafter, components included in the resin liquid used in the resin liquid attachment step and components which may be included will be described.

2.1.1. First Resin

The resin liquid used in the resin liquid attachment step contains a resin. The resin contained in the resin liquid is referred to as a first resin. The first resin has a function of improving abrasion resistance by decreasing surface tension of the surface of the recording medium, or improving adhesion of the image to be recorded on the surface of the recording medium. Also, the first resin, in a case where the recording medium has low absorbability, has a function of suppressing the permeation of a reactant to the recording medium by blocking pores on the surface of the recording medium. In other words, the first resin has a function of fixing the reactant near the surface of the recording medium.

Examples of the first resin included in the resin liquid include well-known resins such as a urethane-based resin, an acrylic resin, a fluorene-based resin, a polyolefin-based resin, a rosin modified resin, a terpene-based resin, a polyester-based resin, a polyamide-based resin, an epoxy-based resin, and a vinyl chloride-based resin. These resins may be used alone, or two or more thereof may be used in combination.

Among the aforementioned resins, the first resin included in the resin liquid according to the embodiment preferably includes a urethane-based resin, an acrylic resin, and a polyolefin-based resin. When these resins are used, the effect of decreasing the surface tension of the surface of the recording medium, or the effect of improving adhesion of the image becomes more excellent.

The urethane-based resin is a general name of the resin having urethane bond. As the urethane-based resin, in addition to the urethane bond, a polyether-based urethane resin including ether bond on a main chain, a polyester-based urethane resin including ester bond on a main chain, and a polycarbonate-based urethane resin including carbonate bond on a main chain may be used. As the urethane-based resin, commercially available products may be used, for example, commercially available products such as SUPER FLEX 460, 460s, 840, E-4000 (trade name, manufactured by DKS Co., Ltd.), RESAMINE D-1060, D-2020, D-4080, D-4200, D-6300, D-6455 (trade name, manufactured by Dainichiseika Color&Chemicals Mfg. Co., Ltd.), TAKELAC WS-6021, W-512-A-6 (trade name, manufactured by Mitsui Chemicals Polyurethanes INC.,), SUNCURE 2710 (trade name, manufactured by LUBRIZOL Corporation), and Permalin UA-150 (trade name, manufactured by Sanyo Chemical Industries, Ltd.) may be used.

The acrylic resin is a general name of a polymer obtained by polymerizing at least an acrylic monomer such as (meth)acrylic acid, (meth)acrylate, and acrylamide, acrylonitrile, and the examples thereof include a (meth)acryl resin obtained from the acrylic monomer, and a copolymer of the acrylic monomer and monomers other than the acrylic monomer (for example, a vinyl monomer). As a resin emulsion using the acrylic resin as a raw material, commercially available products may be used, and the examples thereof include FK-854 (trade name, manufactured by CHIRIKA. Co., ltd.), Mowinyl 952B, 718A (trade name, manufactured by The Nippon Synthetic Chemical Industry Co., Ltd.), Nipol LX852, and LX874 (trade name, manufactured by ZEON Corporation).

In addition, in the specification, a styrene acrylic resin described below may be used as an acrylic resin. Also, in the specification, the description of (meth)acryl means at least one of acryl and methacryl.

The styrene acrylic resin is a copolymer obtained from a styrene monomer and acrylic monomer, and the examples thereof include a styrene-acrylic acid copolymer, a styrene-methacrylic acid copolymer, a styrene-methacrylic acid-acrylate copolymer, a styrene-α-methylstyrene-acrylic acid copolymer, and a styrene-α-methylstyrene-acrylic acid-acrylate copolymer. As the styrene acrylic resin, commercially available products may be used, and the examples thereof include JONCRYL 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, 7610 (trade name, MANUFACTURED BY BASF JAPAN LTD.), Mowinyl 966A, 975N (trade name, manufactured by The Nippon Synthetic Chemical Industry Co., Ltd.), and VINYBLAN 2586 (trade name, manufactured by Nissin Chemical Co., Ltd.).

The polyolefin-based resin has olefin such as ethylene, propylene, and butyrene as a structural skeleton, and the well-known resins may be appropriately selected to be used. As the olefin resin, commercially available products may be used, and the examples thereof include Arrowbase CB-1200 and CD-1200 (trade name, manufactured by UNITIKA LTD.).

The first resin included in the resin liquid preferably includes a resin having a glass transition temperature (Tg) of 50° C. or lower, more preferably includes a resin having Tg of −80° C. to 50° C., and still more preferably includes a resin having Tg of −80° C. to 40° C. When the first resin includes a resin having Tg of 50° C. or lower, adhesion of the resin liquid to the recording medium may become excellent, and when the first resin includes a resin having Tg of −80° C. or higher, it possible to suppress that the tackiness of the resin liquid attached on the recording medium is excessively increased. In addition, when the Tg is equal to or lower than room temperature (25° C.), film forming properties (film forming) of the resin may become excellent. The glass transition temperature of the first resin included in the resin liquid can be changed by changing at least one of resin modification, a polymerization condition, and a type or a configuration ratio of the substances which constitute a resin used when performing polymerization to obtain the first resin, such as a monomer, a compound having two or more isocyanate groups, and a compound having two or more active hydrogen groups. Examples of the polymerization condition include a temperature of the polymerization, a type of the medium to contain a monomer, a monomer concentration in the medium, and a polymerization initiator, or a type or a use amount of a catalyst used for the polymerization. The glass transition temperature can be measured by a differential scanning calorimetry (DSC method) based on JIS K7121.

The content of the first resin (in terms of solid content) is preferably 1% by mass to 15% by mass, and more preferably 1% by mass to 10% by mass with respect to the total mass of the resin liquid. When the content of the first resin included in the resin liquid is within the aforementioned range, the effect of increasing wettability of the surface of the recording medium, or the effect of improving adhesion of the image can become more excellent.

The first resin may be included in the resin liquid as a dispersing element such as an emulsion, or may be included in the resin liquid in a state of being dissolved. When the first resin is included as the dispersing element, it is more preferable from a viewpoint of water resistance or abrasion resistance of the recorded matter.

2.1.2. Water

The resin liquid according to the embodiment may contain water. The water functions as a main medium of the resin liquid, and is evaporated and dispersed by drying. As the water, pure water such as ion exchanged water, ultrafiltrated water, reverse osmotic water, and distilled water, or water from which ionic impurities are completely removed such as ultrapure water is preferable. Also, when water sterilized by irradiation with ultraviolet rays or addition of hydrogen peroxide is used, it is possible to prevent generation of fungi or bacteria when the resin liquid is stored for a long period of time, which is preferable.

The content of water included in the resin liquid may be, for example, 50% by mass or more or 60% by mass or more with respect to the total mass of the resin liquid.

2.1.3. Organic Solvent

The resin liquid according to the embodiment may contain an organic solvent. The organic solvent has a function of increasing adhesion of the resin liquid with respect to the aforementioned recording medium having low absorbability or having non-absorbability, or acting as a moisturizing agent.

The organic solvent is not particularly limited, and the examples thereof include 1,2-alkanediols, polyalcohols, pyrrolidone derivatives, and glycol ethers.

Examples of the 1,2-alkanediols include 1,2-propanediol 1,2-butanediol, 1,2-pentanediol, 1,2-hexanediol, and 1,2-octanediol. The 1,2-alkanediols has an excellent effect of causing the recording medium to wet uniformly by increasing wettability of the resin liquid with respect to the recording medium. When the 1,2-alkanediols are contained, the content thereof may be 1% by mass to 20% by mass with respect to the total mass of the resin liquid.

Examples of the polyalcohols include ethylene glycol, diethylene glycol, propylene glycol, dipropylene glycol, 1,3-propanediol, 1,4-butanediol, 1,6-hexanediol, trimethylolpropane, and glycerin. When the polyalcohols are contained, the content thereof may be 2% by mass to 30% by mass with respect to the total mass of the resin liquid.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. The pyrrolidone derivatives may be act as an excellent solubilizer of the resin.

Examples of the glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These may be used alone, or two or more thereof may be used in combination. The glycol ethers can control wettability of the resin liquid with respect to the recording medium.

2.1.4. Surfactant

The resin liquid according to the embodiment may contain a surfactant. The surfactant has a function of increasing wettability with respect to the recording medium by decreasing the surface tension. Among the surfactant, for example, an acetylene glycol-based surfactant, a silicone-based surfactant, and a fluorine-based surfactant may be preferably used.

The acetylene glycol-based surfactant is not particularly limited, and the examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (trade name, all of the above are manufactured by Air Products and Chemicals. Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, AE-3 (trade name, all of the above are manufactured by Nissin Chemical Co., Ltd.), ACETYLENOL E00, E00P, E40, and E100 (trade name, all of the above are manufactured by Kawaken Fine Chemicals Co., Ltd.).

The silicone-based surfactant is not particularly limited, and a polysiloxane-based compound is preferable. The polysiloxane-based compound is not particularly limited and the examples thereof include polyether modified organosiloxanes. Examples of the commercially available products polyether modified organosiloxanes include BYK-306, BYK-307, BYK-333, BYK-341, BYK-345, BYK-346, BYK-348 (trade name, all of the above are manufactured by BYK JAPAN K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade name, manufactured by Shin-Etsu Chemical Co., Ltd.).

As the fluorine-based surfactant, a fluorine modified polymer is preferably used, and the specific example thereof is BYK-340 (manufactured by BYK Japan K.K.).

When the surfactant is contained, the content thereof may be 0.1% by mass to 1.5% by mass with respect to the total mass of the resin liquid.

2.1.5. Other Components

The resin liquid according to the embodiment, if necessary, may contain a pH adjuster, a preservative, a fungicide, an antirust agent, and a chelating agent.

2.1.6. Properties of Resin Liquid

When the resin liquid according to the embodiment is attached to the recording medium by the ink jet method, the surface tension at a temperature of 20° C. is preferably 20 mN/m to 40 mN/m, and more preferably 25 mN/m to 35 mN/m, from a viewpoint of taking a balance between an image quality and reliability of the ink for ink jet recording. Also, when the resin liquid according to the embodiment is attached to the recording medium by the ink jet method, from the same viewpoint, the viscosity of the reaction liquid at a temperature of 20° C. is preferably 3 mPa·s to 10 mPa·s, and more preferably 3 mPa·s to 8 mPa·s.

2.2. Reaction Liquid

In the ink jet recording method according to the embodiment, the reaction liquid is used in the reaction liquid attachment step. Hereinafter, components included in the reaction liquid and components which may be included will be described.

2.2.1. Reactant

The reaction liquid according to the embodiment contains a reactant. The reactant has a function of aggregating a coloring material by reacting the coloring material included in the coloring ink with a pigment dispersing element and/or a resin which may be included in the coloring ink. By doing this, color developing properties of the image to be recorded by the coloring ink can be improved. Also, the reactant can increase viscosity (thicken) of the coloring ink by reacting a pigment dispersing element and/or a resin which may be included in the coloring ink. By doing this, effusion or bleed of the coloring ink can be reduced.

The reactant is not particularly limited, and the examples thereof include a metal salt, an organic acid, and other cationic compounds. As the other cationic compounds, a cationic resin and a cationic surfactant can be used. Among these reactants, at least one selected from the multivalent metal salt and the organic acid is preferably used, from a viewpoint of having excellent reactivity with the components included in the coloring ink. As the metal salt, the multivalent metal salt is preferable, and a monovalent metal salt can be used.

By neutralizing a surface charge of the components included in the coloring ink or changing pH of the coloring ink using the reactant, these components are aggregated or precipitated, and the coloring ink is aggregated or precipitated. Examples of the components which are reacted with the reactant included in the coloring ink include a coloring material and a resin described below.

The multivalent metal compound is not limited to the following, and the examples thereof include a titanium compound, a chromium compound, a copper compound, a cobalt compound, a strontium compound, a barium compound, an iron compound, an aluminium compound, a calcium compound, a magnesium compound, and salts thereof (multivalent metal salt). Among these multivalent metal compounds, in order to effectively aggregate a pigment, at least one selected from the group consisting of an aluminium compound, a calcium compound, a magnesium compound, and salts thereof is preferable, dissociable salts of alkali earth metals such as calcium and magnesium are more preferable, and at least any one of a calcium salt and a magnesium salt is still more preferable.

In addition, as the multivalent metal compounds, ionic multivalent metal salt is preferable, in particular, when the aforementioned multivalent metal salt is a magnesium salt or a calcium salt, stability of the reaction liquid becomes more excellent. In addition, the counter ion of the multivalent metal may be any of an inorganic acid ion and an organic acid ion.

The specific examples of the aforementioned metal salt include calcium carbonate such as heavy calcium carbonate and light calcium carbonate, calcium nitrate, calcium chloride, calcium sulfate, magnesium sulfate, barium sulfate, zinc carbonate, aluminium silicate, calcium silicate, and magnesium silicate. Among the above, in order to secure sufficient solubility in water, and reduce a trace due to the reaction liquid (so as to make the trace inconspicuous), at least any one of magnesium sulfate, calcium nitrate, and calcium chloride is preferable, and calcium nitrate is more preferable. Examples of the monovalent metal salt include a monovalent metal salt such as a sodium salt and a potassium salt. Examples of the metal salt include sodium sulfate and potassium sulfate.

In addition, examples of the multivalent metal compounds include, in addition to the above, an inorganic pigment such as a chalk, kaolin, calcined clay, talc, titanium oxide, zinc oxide, zinc sulfide, synthesized silica, aluminium hydroxide, alumina, sericite, white carbon, saponite, calcium montmorillonite, sodium montmorillonite, and bentonite, and an organic pigment such as acrylic plastic pigment and an urea polymer substance.

The preferable examples of the organic acid include polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and derivatives of these compounds, or salts thereof. The organic acid may be used alone, or two or more thereof may be used in combination.

Examples of the inorganic acid include sulfuric acid, hydrochloric acid, nitric acid, phosphoric acid, and salts thereof. The inorganic acid may be used alone, or two or more thereof used in combination.

Examples of the cationic resin include a cationic urethane-based resin, a cationic olefin-based resin, and a cationic allylamine-based resin.

As the cationic urethane-based resin, the well-known resins can be appropriately selected to be used. As the cationic urethane-based resin, commercially available products can be used, and for example, HYDRAN CP-7010, CP-7020, CP-7030, CP-7040, CP-7050, CP-7060, CP-7610 (trade name, manufactured by DIC Corporation), SUPER FLEX 600, 610, 620, 630, 640, 650 (trade name, manufactured by DKS Co., Ltd.), urethane emulsion WBR-2120C, and WBR-2122C (trade name, manufactured by TAISEI FINE CHEMICAL CO., LTD.) can be used.

The cationic olefin resin has olefin such as ethylene and propylene as a structural skeleton, and the well-known resins can be appropriately selected to be used. Also, the cationic olefin resin may be an emulsion which is dispersed in a solvent including water or an organic solvent. As the cationic olefin resin, commercially available products can be used, and the examples thereof include Arrowbase CB-1200 and CD-1200 (trade name, manufactured by UNITIKA LTD.).

As the cationic allylamine-based resin, the well-known resins can be appropriately selected to be used, and the examples thereof include poly allylamine hydrochloride, poly allylamine amide sulfate, an allylamine hydrochloride.diallylamine hydrochloride copolymer, an allylamine acetate. diallylamine acetate copolymer, an allylamine acetate.diallylamine acetate copolymer, an allylamine hydrochloride.dimethyl allylamine hydrochloride copolymer, an allylamine.dimethyl allylamine copolymer, poly diallylamine hydrochloride, poly methyl diallylamine hydrochloride, poly methyl diallylamine amide sulfate, poly methyl diallylamine acetate, poly diallyl dimethyl ammonium chloride, a diallylamine acetate.sulfur dioxide copolymer, a diallyl methylethyl ammonium ethyl sulfate.sulfur dioxide copolymer, a methyldiallylamine hydrochloride.sulfur dioxide copolymer, a diallyldimethyl ammonium chloride.sulfur dioxide copolymer, and a diallyldimethyl ammonium chloride.acrylamide copolymer. As the cationic allylamine-based resin, commercially available products can be used, and the examples thereof include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, PAS-J-81 (trade name, manufactured by NITTOBO MEDICAL CO., LTD.), HYMO Neo-600, HYMOLOC Q-101, Q-311, Q-501, HIMAX SC-505, and SC-505 (trade name, manufactured by HYMO Co., Ltd.).

Examples of the cationic surfactant include primary, secondary, and tertiary amine salt-type compounds, an alkylamine salt, a dialkylamine salt, an aliphatic amine salt, a benzalkonium salt, a quaternary ammonium salt, a quaternary alkylammonium salt, an alkyl pyridinium salt, a sulfonium salt, a phosphonium salt, an onium salt, and an imidazolinium salt. The specific examples thereof include hydrochlorides or acetates of laurylamine, coconut-type amine, rosin amine, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridiniumbromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, and octadecyl dimethyl ammonium chloride.

The content of the reactant can be appropriately determined so as to exhibit the aforementioned effect, and for example, 0.1% by mass to 40% by mass is preferable, and 2% by mass to 25% by mass is more preferable with respect to the total mass of the reaction liquid.

2.2.2. Water

The reaction liquid according to the embodiment may contain water. Since the preferable water to be used is same as those exemplified in the description of the resin liquid, the description thereof is omitted. The content of the water included in the reaction liquid may be, for example, 50% by mass or more with respect to the total mass of the reaction liquid.

2.2.3. Organic Solvent

The reaction liquid according to the embodiment may contain an organic solvent. The organic solvent has a function of wettability of the reaction liquid with respect to the aforementioned recording medium having low absorbability or non-absorbability. As the organic solvent, the same organic solvent exemplified in the description of the resin liquid can be used, and the description thereof is omitted. The content of the organic solvent is not particularly limited, and for example, may be 1% by mass to 40% by mass with respect to the total mass of the reaction liquid.

2.2.4. Surfactant

The reaction liquid according to the embodiment may contain a surfactant. The surfactant has a function of improving wettability with respect to the recording medium by decreasing the surface tension of the reaction liquid. Among the surfactant, for example, an acetylene glycol-based surfactant, a silicone-based surfactant, or a fluorine-based surfactant can be preferably used. As the specific examples of the surfactant, since the same surfactant exemplified in the description of the resin liquid can be used, the description thereof is omitted. The content of the surfactant is not particularly limited, and may be 0.1% by mass to 1.5% by mass with respect to the total mass of the reaction liquid.

2.2.5. Other Components

The reaction liquid according to the embodiment, if necessary, may contain a pH adjuster, a preservative, a fungicide, an antirust agent, a chelating agent, and a resin.

2.2.6. Properties of Reaction Liquid

When the reaction liquid according to the embodiment is attached to the recording medium by the ink jet method, the surface tension at a temperature of 20° C. is preferably 20 mN/m to 40 mN/m, and more preferably 25 mN/m to 35 mN/m, from a viewpoint of taking a balance between an image quality and reliability of the ink for ink jet recording. Also, when the resin liquid is attached to the recording medium by the ink jet method, from the same viewpoint, the viscosity at a temperature of 20° C. is preferably 3 mPa·s to 10 mPa·s, and more preferably 3 mPa·s to 8 mPa·s.

2.3. Coloring Ink

In the ink jet recording method according to the embodiment, an image is formed using the coloring ink for ink jet recording in the coloring ink attachment step. Hereinafter, components included in the coloring ink and components which may be included to be used in the coloring ink attachment step will be described.

2.3.1. Coloring Material

The coloring ink according to the embodiment contains a coloring material. As the coloring material, a pigment and an acid dye are preferably used from a viewpoint of excellent reactivity with the reactant included in the aforementioned reaction liquid.

Among the pigment, examples of the inorganic pigment include carbon black, iron oxide, and titanium oxide. The carbon black is not particularly limited, and the examples thereof include furnace black, lamp black, acetylene black, and channel black (C.I. pigment black 7). Also, commercially available products of the carbon black for example, No. 2300, 900, MCF88, No. 20B, No. 33, No. 40, No. 45, No. 52, MA7, MA8, MA100, No. 2200B (trade name, all of the above are manufactured by Mitsubishi Chemical Corporation), color black FW1, FW2, FW2V, FW18, FW200, 5150, S160, 5170, PRINTEX 35, U, V, 140U, special black 6, 5, 4A, 4, 250 (trade name, all of the above are manufactured by Degussa AG), Conductex SC, Raven 1255, 5750, 5250, 5000, 3500, 1255, 700 (trade name, all of the above are manufactured by Columbian Carbon Japan Ltd and Columbian Chemicals), Regal 400R, 330R, 660R, Mogul L, Monarch 700, 800, 880, 900, 1000, 1100, 1300, 1400, and Elftex 12 (trade name, all of the above are manufactured by Cabot Corporation).

Examples of the organic pigment include quinacridone-based pigment, a quinacridone quinone-based pigment, a dioxazine-based pigment, a phthalocyanine-based pigment, an anthrapyrimidine-based pigment, an anthranthrone-based pigment, an indanthrone-based pigment, a flavanthrone-based pigment, a perylene-based pigment, a diketopyrrolo-pyrrole-based pigment, a perinone-based pigment, a quinophthalon-based pigment, an anthraquinone-based pigment, a thioindigo-based pigment, a benzimidazolone-based pigment, an isoindoline-based pigment, an azomethine-based pigment, and an azo-based pigment. The specific examples of the organic pigment include the following.

The pigment used for a cyan ink include C.I. pigment blue 1, 2, 3, 15, 15:1, 15:2, 15:3, 15:4, 15:6, 15:34, 16, 18, 22, 60, 65, 66, C.I. Vat blue 4, and 60.

The pigment used for a magenta ink include C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, 264, C.I. pigment violet 19, 23, 32, 33, 36, 38, 43, and 50.

The pigment used for a yellow ink include C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

In addition, examples of the pigment used for an ink having colors other than the above, such as a green ink and an orange ink include the well-known pigments. The pigment may be used alone, or two or more thereof may be used in combination.

Examples of the acid dye include an azo-based acid dye, an anthraquinone-based acid dye, a pyrazolone-based acid dye, a phthalocyanine-based acid dye, a xanthene-based acid dye, an indigoid-based acid dye, and a triphenylmethane-based acid dye. The specific examples of the acid dye include C.I. Acid yellow 17, 23, 42, 44, 79, 142, C.I. Acid red 52, 80, 82, 249, 254, 289, C.I. Acid blue 9, 45, 249, C.I. Acid black 1, 2, 24, and 94. The dye may be used alone, two or more thereof may be used in combination.

2.3.2. Resin Dispersant

When the pigment is used as the coloring material, it is preferable the pigment be stably dispersed in water and maintained, in order to apply the pigment to the coloring ink. As the method for performing the above, the following methods are exemplified: a method of dispersing the pigment in a resin dispersant such as a water-soluble resin and/or water-dispersible resin (hereinafter, the pigment treated by this method is referred to as "resin-dispersed pigment"); a method of dispersing the pigment in a dispersant (hereinafter, the pigment treated by this method is referred to as "dispersant-dispersed pigment"); and a method of chemically or physically introducing a hydrophilic functional group into a pigment particle surface so as to disperse and/or dissolve the pigment in water without the resin or the dispersant (hereinafter, the pigment treated by this method is referred to as "surface-treated pigment").

The coloring ink according to the embodiment can use any of the resin-dispersed pigment, the dispersant-dispersed pigment, and the surface-treated pigment, and if necessary, a plurality of the pigments can be used in combination, but it is preferable to contain the resin-dispersed pigment.

Examples of the resin dispersant used for the resin-dispersed pigment include polyvinyl alcohols, polyacrylic acid, an acrylic acid-acrylonitrile copolymer, an vinyl acetate-acrylate copolymer, an acrylic acid-acrylate copolymer, a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer, a styrene-maleic acid copolymer, styrene-maleic anhydride copolymer, vinylnaphthalene-acrylic acid copolymer, a vinylnaphthalene-maleic acid copolymer, a vinyl acetate-maleate copolymer, a vinyl acetate-crotonic acid copolymer, a vinyl acetate-acrylic acid copolymer, and salts thereof. Among the above, a copolymer of a monomer having a hydrophobic functional group and a monomer having a hydrophilic functional group, and a polymer formed of a monomer having a hydrophobic functional group and a hydrophilic functional group in combination. As the type of the copolymer, any of a random copolymer, a block copolymer, an alternating copolymer, and a graft copolymer may be used.

The content ratio of the resin dispersant can be appropriately selected depending on the pigment to be dispersed, and the conten ratio thereof is preferably 5 parts by mass to 200 parts by mass, and more preferably 30 parts by mass to 120 parts by mass with respect to the 100 parts by mass of the pigment content in the coloring ink.

2.3.3. Water

The coloring ink according to the embodiment contains water. Since the preferable water to be used is same as those exemplified in the description of the resin liquid, the description thereof is omitted. The content of the water may be, for example, 50% by mass or more with respect to the total mass of the coloring ink.

2.3.4. Organic Solvent

The coloring ink according to the embodiment may contain an organic solvent. The organic solvent has a function of increasing adhesion of the reaction liquid with respect to the aforementioned recording medium having low absorbability or non-absorbability, or preventing drying of the head of the ink jet recording apparatus. As the specific examples of the organic solvent, since the same organic solvent exemplified in the description of the resin liquid can be used, the description thereof is omitted. The content of the organic solvent is not particularly limited, and for example, may be 1% by mass to 40% by mass with respect to the total mass of the coloring ink.

2.3.5. Surfactant

The coloring ink according to the embodiment may contain a surfactant. The surfactant has a function of improving wettability with respect to the recording medium by decreasing the surface tension of the reaction liquid. Among the surfactant, for example, an acetylene glycol-based surfactant, a silicone-based surfactant, or a fluorine-based surfactant can be preferably used. AS the specific examples of the surfactant, since the same surfactant exemplified in the description of the resin liquid can be used, the description thereof is omitted. The content of the surfactant is not particularly limited, and may be 0.1% by mass to 1.5% by mass with respect to the total mass of the coloring ink.

2.3.6. Third Resin

The coloring ink according to the embodiment may contain a resin. The resin included in the coloring ink is referred to as the third resin. The third resin can improve physical strength such as adhesion and abrasion resistance of the image to be recorded. In addition, when the aforementioned resin dispersant is used, the entirety or a part thereof may be considered as the third resin. In this case, the third resin functions as the dispersant of the pigment.

As the specific examples of the third resin, since the same resin as the first resin exemplified in the description of the resin liquid can be used, the description thereof is omitted. When the third resin is contained, the content thereof (in terms of solid content) is preferably 1% by mass to 10% by mass, and more preferably 1% by mass to 7% by mass with respect to the total mass of the coloring ink.

In addition, when the coloring ink contains the third resin, due to the interaction between the third resin and the aforementioned reactant, the viscosity of the coloring ink can be increased. According to this, fluidity of the coloring ink on the recording medium is decreased, and when there is effusion, or a plurality of types of the (respectively different colors) coloring inks are attached, it can be suppressed that these coloring inks are mutually diffused, and bleed can be further suppressed.

2.3.7. Other Components

The coloring ink according to the embodiment, if necessary, may contain a pH adjuster, a preservative, a fungicide, an antirust agent, and a chelating agent.

2.3.8. Properties of Coloring Ink

The surface tension of the coloring ink according to the embodiment at a temperature of 20° C. is preferably 20 mN/m to 40 mN/m, and more preferably 25 mN/m to 35 mN/m, from a viewpoint of taking a balance between an image quality and reliability of the ink for ink jet recording. The surface tension can be measured by for example, confirming the surface tension when a platinum plate is wetted by an ink in an environment of 20° C., using a surface tensiometer CBVP-Z (trade name, manufactured by Kyowa Interface Science Co., Ltd).

In addition, from the same viewpoint, the viscosity of the coloring ink according to the embodiment at a temperature of 20° C. is preferably 3 mPa·s to 10 mPa·s, and more preferably 3 mPa·s to 8 mPa·s. In addition, the viscosity can be measured in an environment of 20° C., for example, using viscoelastic testing machine MCR-300 (trade name, manufactured by Pysica).

2.4. Clear Ink

In the ink jet recording method according to the embodiment, the clear ink is used in the clear ink attachment step. Hereinafter, components included in the clear ink and components which may be included will be described. The clear ink is not a coloring ink used for coloring, and the content of the coloring material is 0.5% by mass or less, and preferably 0.1% by mass or less, and further preferably 0.05% by mass or less with respect to the ink, and the coloring material may not be included.

2.4.1. Second Resin

The clear ink used in the clear ink attachment step contains a resin. The resin included in the clear ink is referred to as a second resin. The coloring ink component attached to the recording medium is coated with the second resin and the coloring ink hardly falls off from the recording medium. According to this, the second resin has a function of increasing abrasion resistance of the image. Also, due to the presence of the second resin, since the coloring ink is hardly in contact with moisture from outside, wet abrasion resistance can be imparted. Furthermore, when a step of fusing the second resin is included after the clear ink attachment step, a film of the second resin can be formed on the surface of the recording medium, thereby obtaining a recorded matter having a further higher quality. In the embodiment, when the reaction liquid attachment step and the coloring ink attachment step are performed on the recording medium in which the resin liquid attachment step has been performed, it is observed that abrasion resistance or wet abrasion resistance of the recorded matter tends to be degraded, but due to the clear ink attachment step, abrasion resistance or wet abrasion resistance of the recorded matter can be excellent.

As the specific examples of the second resin, since the same resin as the first resin exemplified in the description of the resin liquid can be used, the description thereof is omitted.

The content (in terms of solid content) of the second resin in the clear ink is 1% by mass to 30% by mass, preferably 1.5% by mass to 25% by mass, and more preferably 2% by mass to 20% by mass with respect to the total mass of the clear ink.

The second resin may be included in the clear ink as the dispersing element such as an emulsion, or may be included in the clear ink in a state of being dissolved. When the second resin is included as the dispersing element, it is more preferable from a viewpoint of water resistance or abrasion resistance of the recorded matter.

In addition, the second resin included in the clear ink may be the same resin as the first resin included in the resin liquid. When the second resin is the same resin as the first resin, affinity of the both resins is increased, and for example, adhesiveness of the first resin and second resin with respect to the recording medium is increased. Also, due to the first resin and second resin, it is possible to increase an effect of enveloping and fixing the coloring material of the coloring ink. According to this effect, when the second resin is the same resin as the first resin, abrasion resistance or wet abrasion resistance of the image can be increased. Here, the same resin refers to the same kind of resin in the classification of the resin, such as the aforementioned urethane-based resin, the acrylic resin, and the fluorene-based resin.

2.4.2 Water

The clear ink according to the embodiment contains water. Since the preferable water to be used is same as those exemplified in the description of the resin liquid, the description thereof is omitted. The content of the water may be, for example, 50% by mass or more with respect to the total mass of the clear ink.

2.4.3. Organic Solvent

The clear ink according to the embodiment may contain an organic solvent. The organic solvent has a function of increasing adhesion of the second resin with respect to the first resin, or preventing drying of the clear ink. As the specific examples of the organic solvent, since the same organic solvent exemplified in the description of the resin liquid can be used, the description thereof is omitted. The content of the organic solvent is not particularly limited, and for example, may be 1% by mass to 40% by mass with respect to the total mass of the coloring ink.

2.4.4. Surfactant

The clear ink according to the embodiment may contain a surfactant. The surfactant has a function of improving wettability with respect to the recording medium by decreasing the surface tension of the reaction liquid. Among the surfactant, for example, an acetylene glycol-based surfactant, a silicone-based surfactant, or a fluorine-based surfactant can be preferably used. As the specific examples of the surfactant, since the same surfactant exemplified in the description of the resin liquid can be used, the description thereof is omitted. The content of the surfactant is not particularly limited, and may be 0.1% by mass to 1.5% by mass with respect to the total mass of the clear ink.

2.4.5. Other Components

The clear ink according to the embodiment, if necessary, may contain a pH adjuster, a preservative, a fungicide, an antirust agent, and a chelating agent.

2.4.6. Properties of Clear Ink

When the clear ink according to the embodiment is attached to the recording medium by the ink jet method, the surface tension at a temperature of 20° C. is preferably 20 mN/m to 40 mN/m, and more preferably 25 mN/m to 35 mN/m, from a viewpoint of taking a balance between an image quality and reliability of the ink for ink jet recording. Also, when the clear ink is attached to the recording medium by the ink jet method, from the same viewpoint, the viscosity of the clear ink at a temperature of 20° C. is preferably 3 mPa·s to 10 mPa·s, and more preferably 3 mPa·s to 8 mPa·s.

3. INK SET

The ink set of the embodiment includes the aforementioned resin liquid including the first resin, the reaction liquid including the reactant for aggregating or thickening the coloring ink component including the coloring material, the aforementioned coloring ink, and the clear ink including the second resin.

The ink set of the embodiment may include, in addition to this configuration, other liquid compositions. Also, the resin liquid, the reaction liquid, and the clear ink of the ink set of the embodiment do not necessarily have properties which can be used in the ink jet recording apparatus. In other words, the resin liquid, the reaction liquid, and the clear ink may have properties appropriate for spin coating, spray coating, gravure roll coating, reverse roll coating, and bar coating.

Accordingly, the ink set of the embodiment is a set of liquids which can be used in the aforementioned ink jet recording method, and may be packaged in any types of set.

4. EXAMPLES

Hereinafter, the invention will be further described by showing Examples and Comparative Examples, but the invention is not limited to the following examples.

4.1. Preparation of Resin Liquid

Each of the components were mixed and stirred so as to have the blending ratio shown in Table 1, thereby obtaining a resin liquid. The numerical values in Table 1 all indicate % by mass, and ion exchanged water was added to the resin liquid such that the total mass of the resin liquid is 100% by mass. In addition, the components described as the component name in Table 1 were prepared as a reagent, and the components described as other than the compound name were prepared as follows. In all of the Tables, a solid content component is based on the mass of the solid content.

Viniblan 2586 (trade name, manufactured by Nissin Chemical Co., Ltd., a water-based styrene-acrylic resin emulsion)

D4200 (trade name: RESAMINE D-4200, manufactured by Dainichiseika Color&Chemicals Mfg. Co., Ltd., a water-based urethane emulsion)

BYK-348 (trade name, manufactured by BYK Japan K.K., silicone-based surfactant)

Each of the resin liquid shown in Table 1 includes substances in Table as the first resin.

TABLE 1

| Composition of Resin liquid | Components | Resin liquid 1 | Resin liquid 2 |
|---|---|---|---|
| First resin | Viniblan 2586 | 15 | — |
| | D4200 | — | 15 |
| Organic solvent | 1,2-hexanediol | 5 | 5 |
| | Propylene glycol | 20 | 20 |
| Surfactant | BYK348 | 1 | 1 |
| Balance | Water | Residual amount | Residual amount |
| | Total | 100 | 100 |

4.2. Preparation of Reaction Liquid

Each of the components were mixed and stirred so as to have the blending ratio shown in Table 2, and then the resultant were filtrated by a 10 μm membrane filter, thereby preparing the reaction liquid. The numerical values shown in Table 2 all indicate % by mass, ion exchanged water was added to the reaction liquid d such that the total mass of the reaction liquid is 100% by mass. The each of the reaction liquids shown in Table 2 includes magnesium sulfate (multivalent metal salt), maleic acid (organic acid), or sodium sulfate (inorganic acid metal salt) as the reactant.

TABLE 2

| Composition of Reaction liquid | Components | Reaction liquid 1 | Reaction liquid 2 | Reaction liquid 3 |
|---|---|---|---|---|
| Reactant | Magnesium sulfate | 5 | — | — |
| | Maleic acid | — | 5 | — |
| | Sodium sulfate | — | — | 5 |
| Organic solvent | 1,2-hexanediol | 5 | 5 | 5 |
| | Propylene glycol | 20 | 20 | 20 |
| Surfactant | BYK348 | 1 | 1 | 1 |
| Balance | Water | Residual amount | Residual amount | Residual amount |
| | Total | 100 | 100 | 100 |

4.3. Preparation of Coloring Ink

Each of the components were mixed and stirred so as to have the blending ratio shown in Table 3, and then the resultant were filtrated by a 10 μm membrane filter, thereby preparing the coloring ink. When preparing the coloring ink, a pigment dispersion containing a pigment, a resin dispersant, and water was created in advance, and the pigment dispersion and the remaining components were mixed. The numerical values shown in Table 3 all indicate % by mass, and ion exchanged water was added to the coloring ink such that the total mass of the coloring ink is 100% by mass. In addition, C.I. pigment blue 15:3 (cyan pigment) was used as the pigment.

TABLE 3

| Composition of coloring ink | Components | Coloring ink 1 |
|---|---|---|
| Pigment | PB15:3 | 5 |
| Organic solvent | 1,2-hexanediol | 5 |
| | Propylene glycol | 20 |
| Surfactant | BYK348 | 1 |
| Balance | Water | Residual amount |
| | Total | 100 |

4.4. Preparation of Clear Ink

Each of the components were mixed and stirred so as to have the blending ratio shown in Table 4, and then the resultant were filtrated by a 10 μm membrane filter, thereby preparing the clear ink. The numerical values shown in Table 4 all indicate % by mass, and ion exchanged water was added to the clear ink such that the total mass of the clear ink is 100% by mass. In addition, each of the clear inks shown in Table 4 includes substances in Table as the second resin.

TABLE 4

| Composition of clear ink | Components | Clear ink 1 | Clear ink 2 |
|---|---|---|---|
| Second resin | Viniblan 2586 | 15 | — |
| | D4200 | — | 5 |
| Organic solvent | 1,2-hexanediol | 5 | 5 |
| | Propylene glycol | 20 | 20 |
| Surfactant | BYK348 | 1 | 1 |
| Balance | Water | Residual amount | Residual amount |
| | Total | 100 | 100 |

4.5. Recording Medium

In addition, in the following evaluation tests, a polypropylene film (trade name "SY51M", manufactured by UPM RAFLATAC, in Table, abbreviated as "recording medium 1") was used as the recording medium having non-absorbability, and a NP coated paper (trade name "NP Coat", manufactured by Lintec Corporation, in Table, abbreviated as "recording medium 2") was used as the recording medium having low absorbability.

4.5. Creation of Recorded Matter

A creation condition and evaluation result of Examples and Comparative Examples are shown in Tables 5 and 6. In each example, the recording medium was coated with the resin liquid by a coater in a coating amount shown in Table 5, dried by heating at a temperature of 60° C. for 10 minutes, and dried to the extent that stickiness cannot be felt by a finger. Subsequently, the modified device of the ink jet printer PX-G930 (manufactured by Seiko Epson Corp.) was filled with the reaction liquid and coloring ink prepared as above so as to be 1 nozzle row/1 droplet. The nozzle density of the nozzle row in the recording head of the printer was 300 dpi. The recording medium was set and coated with the reaction liquid in an attachment amount of shown in Tables 5 and 6. The pattern was a solid pattern of 10 cm×10 cm. After the attachment, the recording medium was set back, the coloring ink was overlapped thereon in the same pattern in an attachment amount of 7 mg/inch$^2$, thereby completing the printing.

After that, the recording medium was set back, and the clear ink was attached thereto by overlapping in the same pattern in a coating amount shown in Tables 5 and 6. The dot resolution of the printing was 1200×1200 dpi in all of the reaction liquid, coloring ink, and clear ink. After that, the recording medium was dried by heating in an oven at a temperature of 60° C. for 10 minutes.

In addition, the printer was configured such that the recording medium can be heated during recording, by mounting a heater on a platen. Table 5 also shows that whether the drying step was performed or not. The examples without the drying step in Table 5 are the examples in which the recording medium was set back immediately after the attachment of the reaction liquid, without operating the heater. The surface temperature of the recording medium during recording was set to 25° C., and the residual rate of volatile component of the reaction liquid at the time of printing the coloring ink was set to 90%. Also, in the examples with the drying step, the heater was operated to set the surface temperature of the recording medium to 45° C. so as to perform printing. After the reaction liquid was printed, until the residual rate of the volatile component of the reaction liquid reached 20%, the printing of the coloring ink was not performed. At this time, the time taken from the completion of the attachment of the reaction liquid to start of the attachment of the coloring ink was recorded.

4.6. Evaluation Tests 4.6.1. Image Quality

In each example, a solid pattern recorded on the surface of the sample recording medium was visually observed, and the presence of printing unevenness (solid filling) was determined. The evaluation standard is as follows.

A: No white streaks and no printing unevenness

B: No white streaks and printing unevenness was confirmed.

D: White streaks and printing unevenness were confirmed.

4.6.2. Abrasion Resistance

The abrasion resistance was evaluated using a color fastness rubbing tester AB-301 (trade name, manufactured by TESTER SANGYO CO., LTD.). Specifically, the surface of the recording medium having an image recorded thereon was rubbed with a friction block having a white cloth (JIS L 0803 standard) attached thereto, until the coating film is peed off by adding a load of 500 g or 50 times in a reciprocating manner. Then, the state where the image (coating film) on the surface of the recording medium was peed off was visually observed. The evaluation standard is as follows.

AA: The coating film was not peed off, even when the surface was rubbed 50 times in a reciprocating manner.

A: The coating film was peed off, when the surface was rubbed 30 to 49 times in a reciprocating manner.

B: The coating film was peed off, when the surface was rubbed 20 to 39 times in a reciprocating manner.

C: The coating film was peed off, when the surface was rubbed 10 to 19 times in a reciprocating manner.

D: The coating film was peed off, when the surface was rubbed within 9 times in a reciprocating manner.

4.6.3. Wet Abrasion Resistance

The wet abrasion resistance was evaluated using the color fastness rubbing tester AB-301 (trade name, manufactured by TESTER SANGYO CO., LTD.). Specifically, the surface of the recording medium having an image recorded thereon was rubbed with a friction block having a white cloth (JIS L 0803 standard) attached thereto, the cloth being sufficiently soaked with distilled water, 700 times in a reciprocating manner by adding a load of 10 g. Then, the state where the image (coating film) on the surface of the recording medium was peed off was visually observed. The evaluation standard is as follows. The evaluation of the wet abrasion resistance is for evaluating durability against water, and different from the evaluation of durability (abrasion resistance) against abrasion using dried cloth.

B: The image was hardly changed.

C: Color loss of the image was recognized.

D: Color loss of the image and peeling of the coating film were recognized.

4.6.4. Recording Speed

The time taken from the completion of the attachment of the reaction liquid to start of the attachment of the coloring ink was shown in Tables 5 and 6 according to the following standard.

B: Within 30 seconds

C: Exceeding 30 seconds 4.7. Evaluation Results

The results of the evaluation tests are shown in Tables 5 and 6.

TABLE 5

|  | Example 1 | Example 2 | Example 3 | Example 4 | Example 5 |
| --- | --- | --- | --- | --- | --- |
| Type of recording medium | Recording medium 1 | Recording medium 1 | Recording medium 1 | Recording medium 1 | Recording medium 1 |
| Type of resin liquid | Resin liquid 1 | Resin liquid 2 | Resin liquid 1 | Resin liquid 1 | Resin liquid 1 |
| Attachment amount of resin liquid (attachment amount of first resin [mg/inch$^2$]) | 0.2 | 0.2 | 0.2 | 0.2 | 0.2 |
| Type of reaction liquid | Reaction liquid 1 | Reaction liquid 1 | Reaction liquid 2 | Reaction liquid 3 | Reaction liquid 1 |
| Attachment amount of reaction liquid (attachment amount of reactant [mg/inch$^2$]) | 0.02 | 0.02 | 0.02 | 0.02 | 0.02 |
| Type of coloring ink | Coloring ink 1 | Coloring ink 1 | Coloring ink 1 | Coloring ink 1 | Coloring ink 1 |
| Type of clear ink | Clear ink 1 | Clear ink 1 | Clear ink 1 | Clear ink 1 | Clear ink 2 |
| Attachment amount of clear ink (attachment amount of clear ink [mg/inch$^2$]) | 1.2 | 1.2 | 1.2 | 1.2 | 1.2 |
| Whether to include drying step or not | No | No | No | No | No |
| Image quality | A | A | B | B | A |
| Abrasion resistance | A | B | A | A | B |
| Wet abrasion resistance | B | B | A | B | B |
| Recording speed | B | B | B | B | B |

TABLE 5-continued

|  | Example 6 | Example 7 | Example 8 | Example 9 | Example 10 |
|---|---|---|---|---|---|
| Type of recording medium | Recording medium 1 | Recording medium 1 | Recording medium 2 | Recording medium 2 | Recording medium 2 |
| Type of resin liquid | Resin liquid 2 | Resin liquid 1 | Resin liquid 1 | Resin liquid 2 | Resin liquid 1 |
| Attachment amount of resin liquid (attachment amount of first resin [mg/inch$^2$]) | 0.2 | 0.2 | 0.2 | 0.2 | 0.2 |
| Type of reaction liquid | Reaction liquid 1 | Reaction liquid 1 | Reaction liquid 1 | Reaction liquid 1 | Reaction liquid 1 |
| Attachment amount of reaction liquid (attachment amount of reactant [mg/inch$^2$]) | 0.02 | 0.02 | 0.02 | 0.02 | 0.02 |
| Type of coloring ink | Coloring ink 1 | Coloring ink 1 | Coloring ink 1 | Coloring ink 1 | Coloring ink 1 |
| Type of clear ink | Clear ink 2 | Clear ink 1 | Clear ink 1 | Clear ink 1 | Clear ink 1 |
| Attachment amount of clear ink (attachment amount of clear ink [mg/inch$^2$]) | 1.2 | 1.2 | 1.2 | 1.2 | 1.2 |
| Whether to include drying step or not | No | Yes | No | No | Yes |
| Image quality | A | A | B | B | A |
| Abrasion resistance | A | AA | A | B | A |
| Wet abrasion resistance | B | B | — | — | — |
| Recording speed | B | C | B | B | C |

TABLE 6

|  | Example 11 | Example 12 | Example 13 | Comparative Example 1 | Comparative Example 2 | Comparative Example 3 |
|---|---|---|---|---|---|---|
| Type of recording medium | Recording medium 1 | Recording medium 1 | Recording medium 1 | Recording medium 1 | Recording medium 1 | Recording medium 1 |
| Type of resin liquid | Resin liquid 1 | Resin liquid 1 | Resin liquid 1 | — | Resin liquid 1 | Resin liquid 1 |
| Attachment amount of resin liquid (attachment amount of first resin [mg/inch$^2$]) | 0.2 | 0.1 | 0.2 | — | 0.2 | 0.2 |
| Type of reaction liquid | Reaction liquid 1 | Reaction liquid 1 | Reaction liquid 1 | Reaction liquid 1 | — | Reaction liquid 1 |
| Attachment amount of reaction liquid (attachment amount of reactant [mg/inch$^2$]) | 0.01 | 0.02 | 0.02 | 0.02 | — | 0.02 |
| Type of coloring ink | Coloring ink 1 | Coloring ink 1 | Coloring ink 1 | Coloring ink 1 | Coloring ink 1 | Coloring ink 1 |
| Type of clear ink | Clear ink 1 | Clear ink 1 | Clear ink 1 | Clear ink 1 | Clear ink 1 | — |
| Attachment amount of clear ink (attachment amount of clear ink [mg/inch$^2$]) | 1.2 | 1.2 | 0.8 | 1.2 | 1.2 | — |
| Whether to include drying step or not | No | No | No | No | No | No |
| Image quality | B | B | A | D | D | A |
| Abrasion resistance | A | A | B | B | AA | D |
| Wet abrasion resistance | A | A | C | B | B | D |
| Recording speed | B | B | B | B | B | B |

|  | Comparative Example 4 | Comparative Example 5 | Comparative Example 6 | Comparative Example 7 | Comparative Example 8 |
|---|---|---|---|---|---|
| Type of recording medium | Recording medium 2 | Recording medium 2 | Recording medium 2 | Recording medium 1 | Recording medium 1 |
| Type of resin liquid | — | Resin liquid 1 | Resin liquid 1 | — | Resin liquid 1 |
| Attachment amount of resin liquid (attachment amount of first resin [mg/inch$^2$]) | — | 0.2 | 0.2 | — | 0.2 |
| Type of reaction liquid | Reaction liquid 1 | — | Reaction liquid 1 | Reaction liquid 1 | — |
| Attachment amount of reaction liquid (attachment amount of reactant [mg/inch$^2$]) | 0.02 | — | 0.02 | 0.02 | — |

TABLE 6-continued

| Type of coloring ink | Coloring ink 1 | Coloring ink 1 | Coloring ink 1 | Coloring ink 1 | Coloring ink 1 |
|---|---|---|---|---|---|
| Type of clear ink | Clear ink 1 | Clear ink 1 | — | — | — |
| Attachment amount of clear ink (attachment amount of clear ink [mg/inch$^2$]) | 1.2 | 1.2 | — | — | — |
| Whether to include drying step or not | No | No | No | No | No |
| Image quality | D | D | A | D | D |
| Abrasion resistance | A | AA | D | D | C |
| Wet abrasion resistance | — | — | — | B | B |
| Recording speed | B | B | B | B | B |

In all of the Examples, image quality, abrasion resistance, wet abrasion resistance, and recording speed were excellent, in all of the Comparative Example, at least one of the image quality, abrasion resistance, wet abrasion resistance, and recording speed was insufficient.

Also, at least the following was determined from the results in Tables 5 and 6.

(1) When the Examples 1, 3, 4, and 6 are referred to, in a case where the first resin of the resin liquid and the second resin of the clear ink are the same resin, excellent abrasion resistance is obtained.

(2) When the Example 3 and other examples are compared to each other, the organic acid is more preferable as the reactant of the reaction liquid.

(3) When the Examples 1 and 4 are referred to, even in a case where the reactant of the reaction liquid is a multivalent metal salt, the sufficiently excellent image quality is obtained.

(4) When the Examples 1 and 7, and Examples 8 and 10 are compared to each other, in a case where the drying step is performed, at least either of the image quality or abrasion resistance is improved. This is because due to the low residual rate of the volatile component of the reaction liquid, the damage of the high residual rate of the volatile component is less. In contrast, the drying step causes the printing speed to be decreased. From this reason, when the residual rate of the volatile component is high, the embodiment is particularly advantageous. Also, the recording speed (time taken for recording) in Example 1 was about 5 seconds.

(5) When the Examples 1 and 8, and Examples 2 and 9 are referred to, the effect of improving the image quality according to the recording method of the invention is more remarkable with respect to the recording medium having non-absorbability than the recording medium having low absorbability.

(6) When the Comparative Example 1 is referred to, since the resin liquid is not used, adhesion is decreased, and the reaction liquid is repelled, thereby deteriorating the image quality.

(7) When the Comparative Example 2 is referred to, since the reaction liquid is not used, the coloring material of the coloring ink cannot be aggregated, which causes deterioration of the image quality, and irregularities of droplets of the coloring ink are decreased, which improves abrasion resistance more than in Example 1.

(8) When the Comparative Example 3 is referred to, since the clear ink is not used, abrasion resistance and wet abrasion resistance are deteriorated. There is a tendency that if the first resin and reactant exist, the image quality becomes excellent, in contrast, wet abrasion resistance is deteriorated. It is assumed that adhesion between the first resin and coloring ink is deteriorated because of the reactant included in the reaction liquid.

(9) When the Comparative Example 4 is referred to, since the resin liquid is not used, the image quality is deteriorated. It is considered that the reaction liquid permeates within the recording medium 2 having low absorbability, and causes the reactant and coloring ink not to be sufficiently in contact with each other.

(10) When the Comparative Example 5 is referred to, since the reaction liquid is not used, the image quality is deteriorated. It is considered that this is because the coloring ink component could not be aggregated. Also, since the reaction liquid is not used, the droplets of the coloring ink do not become granular, and abrasion resistance is slightly improved.

(11) When the Comparative Example 6 is referred to, since the clear ink is not used, abrasion resistance is deteriorated.

(12) When the Comparative Example 7 is referred to, since the resin liquid is not used, the image quality and abrasion resistance are deteriorated, but although the clear ink is not used, wet abrasion resistance is not remarkably deteriorated.

(13) When the Comparative Example 8 is referred to, in a case where the reaction liquid is not used, but the resin liquid is used, the image quality and abrasion resistance are deteriorated, but wet abrasion resistance is not remarkably deteriorated.

(14) According to the ink jet recording method of the invention, since both the resin liquid and reaction liquid are used, the image quality and abrasion resistance are excellent, and since the clear ink is used, wet abrasion resistance is excellent.

In addition, in the aforementioned respective examples, a serial printer was used, but it is apparent that a line printer may be used in the invention. In a case of the line printer, for example, the printer may include a line head for attaching the reaction liquid, a line head for attaching the coloring ink, and a line head for attaching the clear ink, and each of the inks may be attached (coated) to the recording medium to be transported. The printer may further include a line head for attaching the resin liquid, and the attachment of the resin liquid may be performed such that the recording medium is coated with the resin liquid by roller coating, and the recording medium are attached (coated with) by the reaction liquid, coloring ink, and clear ink. In a case of the line printer, the recording speed is particularly high, and the embodiment is particularly advantageous.

The present invention is not limited to the aforementioned embodiment, and further can be modified variously. For example, the invention includes the substantially same configuration (for example, a configuration of which a function, method, and result are the same, or a configuration of which a purpose and result are the same) as the configuration stated in the embodiment. In addition, the invention includes a configuration of which a non-essential part stated in the embodiment is substituted. In addition, the invention includes a configuration exhibiting the same effect, or a configuration capable of achieving the same purpose stated in the embodiment. In addition, the invention includes a configuration in which the well-known technology is added to the configuration stated in the embodiment.

The entire disclosure of Japanese Patent Application No. 2015-038291, filed Feb. 27, 2015 and 2015-075128, filed Apr. 1, 2015 are expressly incorporated by reference herein.

What is claimed is:

1. An ink jet recording method comprising:
    attaching a resin liquid including a resin to a recording medium having non-absorbability;
    attaching a reaction liquid including a reactant for aggregating or thickening a coloring ink component having a coloring material to an area where the resin liquid is attached;
    attaching the coloring ink to an area where the reaction liquid is attached by an ink jet method; and
    attaching a clear ink including a resin,
    wherein the attaching of the resin liquid includes the attaching of the resin liquid in which the attachment amount of the resin in the area where the resin liquid is attached is 0.05 mg/inch$^2$ to 0.2 mg/inch$^2$; and
    wherein the attaching of the reaction liquid includes the attaching of the reaction liquid in which the attachment amount of the reactant included in the reaction liquid in the area where the reaction liquid is attached is 0.01 mg/inch$^2$ to 0.1 mg/inch$^2$.

2. The ink jet recording method according to claim 1, wherein the clear ink is a water-based clear ink including a dispersing element of the resin.

3. The ink jet recording method according to claim 1, wherein the resin liquid is a water-based resin liquid including a dispersing element of the resin.

4. The ink jet recording method according to claim 1, wherein the resin included in the resin liquid and the resin included in the clear ink are the same as each other.

5. The ink jet recording method according to claim 1, wherein the coloring ink starts to be attached, in a state where a residual rate of a volatile component of the reaction liquid attached to the recording medium is 50% by mass or more.

6. The ink jet recording method according to claim 1, wherein the reactant includes at least one of a metal salt, an organic acid, and a cationic compound.

7. The ink jet recording method according to claim 1, wherein the coloring material is a pigment, and the coloring ink is a water-based coloring ink including a resin.

8. The ink jet recording method according to claim 1, wherein the resin included in the resin liquid includes at least one of an acrylic resin, a urethane-based resin, and a polyolefin-based resin.

9. The ink jet recording method according to claim 1, wherein the resin included in the clear ink includes at least one of an acrylic resin, a urethane-based resin, and a polyolefin-based resin.

10. The ink jet recording method according to claim 1, wherein the attaching of the clear ink includes the attaching of the clear ink in which the attachment amount of the clear ink in the area where the clear ink is attached is 0.5 mg/inch$^2$ to 3 mg/inch$^2$.

11. The ink jet recording method according to claim 1, wherein the content of the resin in the clear ink is 2% by mass to 20% by mass.

* * * * *